United States Patent [19]

Saito

[11] 3,902,183

[45] Aug. 26, 1975

[54] VIEW FINDER LIGHT CONTROL IN CAMERA WITH SELF-TIMER

[75] Inventor: Mitsuru Saito, Osaka, Japan

[73] Assignee: Minolta Camera Kabushiki Kaisha, Osaka, Japan

[22] Filed: May 16, 1973

[21] Appl. No.: 360,851

[30] Foreign Application Priority Data
May 19, 1972  Japan.............................. 47-57908

[52] U.S. Cl.................................. 354/219; 354/154
[51] Int. Cl. .......................................... G03b 13/00
[58] Field of Search ........... 95/11 V, 42, 53.3, 53.6; 354/154, 219, 221–225, 237–239

[56] References Cited
UNITED STATES PATENTS
3,613,543  10/1971  Mita et al. ........................... 95/53.3

Primary Examiner—Samuel S. Matthews
Assistant Examiner—E. M. O'Connor
Attorney, Agent, or Firm—Wolder & Gross

[57] ABSTRACT

A single lens reflex camera of the automatic shutter control type including a through the lens viewer having a viewing aperture and a photoelement exposed to light traversing the objective lens and viewing aperture and having a selftimer comprising a shutter control and timing network wherein a memory device stores information in accordance with the photoelement incident light and incident to shutter release, is switched from the light measuring system to the shutter timing system. A blind is manually movable into registry with the viewing aperture and is biased out of registry with the aperture, and the selftimer is locked against operation when the blind is out of registry with the viewing aperture and is released when the blind registers with the viewing aperture to prevent the entry of light through the aperture. The blind is released to its open position either manually or by movement of the reflex mirror of the camera.

5 Claims, 4 Drawing Figures

VIEW FINDER LIGHT CONTROL IN CAMERA WITH SELF-TIMER

BACKGROUND OF THE INVENTION

The present invention relates generally to a single lens reflex camera of the type which controls exposure by the output of an electric light measuring circuit including a light receiving element located within a view finder, and more particularly to a single lens reflex camera of the type wherein scene light transmitted through the objective lens of the camera is projected onto a light sensing element of an electric light measuring circuit by way of a view finder during the viewing and focusing operation and the output of the light measuring circuit is transmitted to and stored in an information or charge storage means which is disconnected from the light measuring circuit during exposure for effecting the exposure in accordance with the voltage stored in the storage means.

In photographic cameras having a light receiving element located in the view finder, difficulties are encountered in that a portion of light incoming through the viewing hole or aperture and eyepiece of the view finder is projected on the light receiving element and superposed on the scene light incident on the light receiving element through the objective lens of the camera, causing errors in the output of the light measuring circuit.

The amount of light coming through the viewing hole of the view finder is in most cases negligible during normal photographing operations since the viewing hole is covered by the eye or face of the operator who looks into the viewing hole. Therefor, the errors in the output of the light measuring circuit in the normal photographic operation can be generally ignored.

However, in photographing operations using the selftimer the operator is in a position distant from the camera during the light measurement by the camera, and the viewing hole of the view finder is left under conditions not shielded from external light with the result that a large amount of light is allowed to enter into the view finder. A portion of the light entering the viewing hole is thus projected onto the light receiving element during the light measurement and the output of the light measurement based on an improper light amount is stored in the storage means, so that the exposure is effected in accordance with an inaccurate control voltage, resulting in material exposure failures.

SUMMARY OF THE INVENTION

It is an object of the present invention to provide a single lens reflex camera of the type having in a view finder a light receiving element of an electric light measuring circuit, the camera employing a viewing hole blind for shielding the light receiving element from light entering or incident on the viewing hole of the view finder during photographing operations using a selftimer.

It is another object of the present invention to provide a single lens reflex camera of the type as mentioned above, the camera employing a light shielding device whereby the selftimer is locked against operation unless a blind is placed in a shielding position between the light receiving element and the viewing hole of the view finder.

It is a further object of the present invention to provide a single lens reflex camera of the above type, the camera employing a movable blind interposed between the light receiving element in the view finder and the viewing hole of the view finder for shielding the light receiving element from light entering the viewing hole, the movable blind being biased to normally assume a non-shielding position, a blocking lever adapted to hold the viewing hole blind in a shielding position against the biased action of the blind, and a locking member adapted to lock a selftimer of the camera in an inoperative position and associated with the blocking lever in such a manner that the selftimer is released from the locking action of the locking member when the viewing hole blind is held in the shielding position by the blocking lever.

With the above objects in view, the present invention provides a single lens reflex camera having in a view finder a light receiving element of a light measuring circuit for receiving scene light transmitted through the objective lens of the camera during light measurement, a storage means for storing the output of the light measuring circuit prior to the photographing operation, the storage means being disconnected from the light measuring circuit during the photographing operation for controlling the exposure in accordance with the voltage stored in the storage means, said camera further comprising a view finder blind member movable for shielding the light receiving element from light incoming through the viewing hole of the view finder and biased to normally assume a non-shielding position, a blocking lever adapted to hold the viewing hole blind member in a shielding position against the biased action of the blind member, and a locking member adapted to lock a selftimer of the camera in an inoperative position and associated with the blocking lever in such a manner that the selftimer is released from the locking action of the locking member when the viewing hole blind member is held in the shielding position by the blocking lever.

The above and other objects, features and advantages of the invention will become apparent from the following description and the appended claims, when taken in conjunction with the accompanying drawings wherein like numerals refer to like parts through the various figures.

DESCRIPTION OF THE PREFERRED EMBODIMENT

Figure 1:
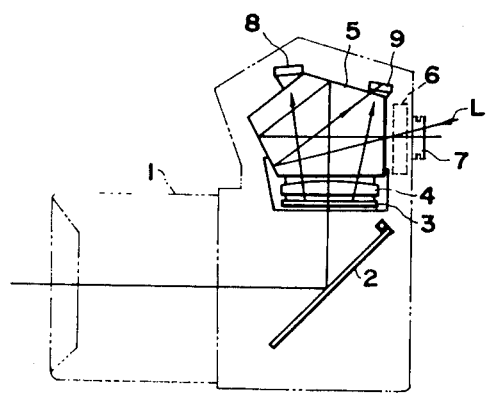
FIG. 1 is a vertically sectioned side view showing diagramatically an embodiment of the single lens reflex camera in accordance with the present invention.

Referring to the accompanying drawings, FIG. 1 shows a single lens reflex camera embodying the present invention wherein arrangements are made such that a portion of the light which has been transmitted through an objective lens of the camera is projected onto a pair of photoresponsive or light receiving elements. The scene light which has been introduced through an interchangeable objective lens 1 which is detachably mounted on the camera body is reflected toward a focusing plate or screen 3 by a swingable reflecting mirror which is movable between a viewing position and a picture taking position, FIG. 1 showing the reflecting mirror in its viewing position. The scene light emitted scatteringly from the focusing plate 3 is transmitted through a condenser lens 4 and a pentagonal prism 5 and then projected toward a viewing hole 7 through a viewing hole shielding device 6 which is enclosed by a broken line, to allow observation of the photographing scene by an operator.

Two light receiving or photoresponsive elements 8 and 9 are located on the front and rear sides of the ridge formed by the roof surface of the pentagonal prism through small prisms for receiving light rays scatteringly emitted from the focusing screen 3. When the viewing hole shielding device 6 is in a non-shielding position, a light ray L entering the view finder through the viewing hole 7 is projected onto the light receiving elements 8 and 9 causing them to produce an output of voltage at the terminal of the light measuring circuit containing the light receiving elements 8 and 9 which does not accurately accord with the scene or object light traversing the objective lens.

Figure 2:
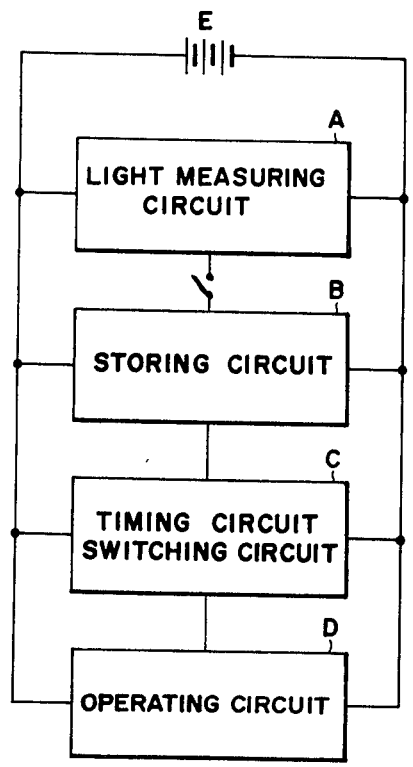
FIG. 2 is a block diagram of an exposure control circuit employed in the embodiment of FIG. 1.

FIG. 2 shows in block diagram an exposure control circuit which controls the exposure by measuring the luminosity of the scene light received by the light receiving elements through the objective lens of the camera. The exposure control circuit comprises a light measuring circuit A including the light receiving elements 8 and 9, a storing circuit B for storing in a storage means a function of the output of the light measuring circuit A, a timing circuit and a switching circuit C which are controlled by the storage voltage of the storing circuit B, and an operating circuit D including an electromagnet which is energized by the output of the switching circuit. The above-mentioned circuits A to D are connected in parallel to a power source E as shown in FIG. 2. In order to attain the operation as mentioned hereinbefore, the storing circuit B is adapted to be connected to the light measuring circuit A in the well known manner by the closing of a switch between circuits A and B when the movable reflecting mirror 2 is in the viewing position and to be disconnected from the light measuring circuit A by the opening of the switch and connected to the timing circuit before the reflecting mirror 2 starts to move into the picture taking position.

Figure 3:
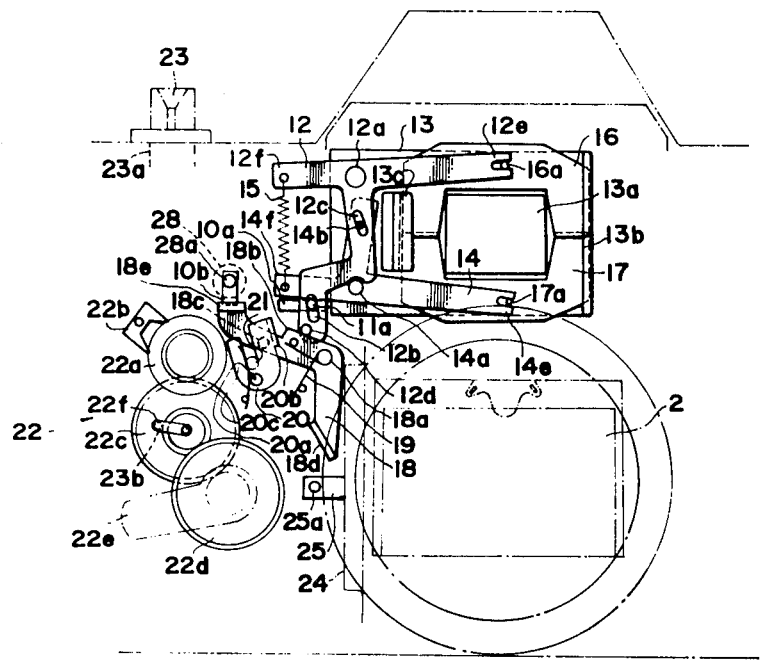
FIG. 3 is a vertically sectioned front view showing detailed construction of the same embodiment.
Figure 4:
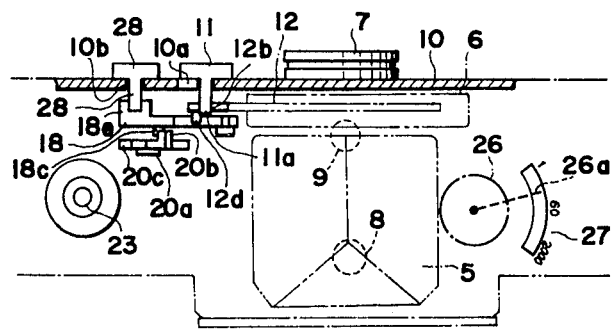
FIG. 4 is a horizontally sectioned plan view of the same embodiment.

Referring to FIGS. 3 and 4 showing in more detail the construction of the viewing hole shielding device 6 embodying the present invention, the driving spring of the selftimer is shown in its charged state in both figures.

The view finder casing of the camera has formed in the rear wall 10 thereof a viewing hole or aperture 7, a transverse guide groove 10a extending transversely below the viewing hole 7 and a vertical guide groove 10b extending vertically below the viewing hole 7 at one side thereof, the transverse guide groove 10a fittingly receiving thereinto a pin member 11a of a closing button 11 which is employed for closing the blind members.

Disposed inside the viewing hole 7 in the rear wall of the view finder is a fixed plate member 13 which has formed therein an opening or aperture 13a and rotatably supports a T-shaped first operating lever 12 on a shaft or pin member 12a.

The first operating lever 12 has provided in the vertically extending arm thereof an upper slot 12c, a lower slot 12b and a locking pin member 12d at the distal end thereof, the lower slot 12b being in engagement with the pin member 11a of the closing button 11.

The first operating lever 12 terminates at the righthand end, as seen in FIG. 3, of the transversely extending arm thereof in yoke 12e and is provided at the lefthand end with a pin member 12f which retains one end of a spring member 15.

Located downwardly of the shaft 12a of the first operating lever 12 is a shaft 14a which supports an inverted similarly T-shaped second operating lever 14 on the plate member 13. The second operating lever 14 is provided on the upwardly extending arm thereof with a pin member 14b which is loosely fitted into the upper slot 12c of the first operating lever 12 and also terminates at the righthand end of the transversely extending arm thereof in a yoke 14e and at the lefthand end is provided with a pin member 14f which retains the other end of spring member 15.

The yokes 12e and 14e of the first and second operating levers 12 and 14 are in engagement with pin members 16a and 17a, respectively, of blind members 16 and 17 which are adapted to shield the opening 13a in the plate member 13, the side edges of the blind members 16 and 17 being in sliding engagement with guide grooves formed vertically along the plate member 13.

A blocking lever 18 is rotatably supported on shaft 18a for abutting engagement at one side edge thereof with the locking pin member 12d of the first operating lever 12 and biased to rotate in a clockwise direction by means of a spring member 19. The blocking lever 18 is formed with a stepped portion 18b for blocking counterclockwise rotation imparted to the first operating lever 12 by the spring member 15, when the blocking lever is in engagement with the locking pin member 12d. The blocking lever 18 is further provided at the opposite ends thereof with a bent portion 18d which engages with a pin member 25a of a releasing lever 25 which is operated in association with the movable reflecting mirror 2, and with a bent portion 18e which engages with a pin member 28a of a manual releasing member 28 respectively. Projecting from the blocking lever 18 is a selftimer release pin member 18c for operating a locking lever 20 of a selftimer mechanism 22.

A U-shaped selftimer locking lever 20 is rotatably supported on the camera body by means of a shaft 20a and is biased to rotate in a counterclockwise direction by means of a spring member 21. The selftimer locking lever 20 has formed on one arm thereof a bent portion 20b for engagement with the selftimer release pin 18c. The other arm of the selftimer locking lever 20 functions to stop rotation of an escape wheel 22a when engaged therewith.

The selftimer mechanism is provided with an anchor or verge 22b which cooperates with the escape wheel 22a, a second gear 22c which is in meshed engagement with the escape wheel 22a, and a first gear 22d which is in meshed engagement with the second gear 22c and has a lever 22e for charging a selftimer driving spring. In the particular embodiment shown, a pin member 23b of a shutter release lever 23a which is operated in association with the shutter release button 23 fittingly engages a radial groove 22f formed in the second gear 22c.

Indicated at 24 is a reflecting mirror driving mechanism of a known construction which is adapted to drive into a picture taking position the movable reflecting mirror which has been locked in the viewing position, and, prior to this release of the reflecting mirror, to disconnect the storing circuit B from the light measuring circuit A and instead connect the same with the timing circuit C.

The mirror driving mechanism 24 is projectingly provided with the releasing lever 25 which has located thereon a pin member 25a for engagement with the bent portion 18d of the counterclockwise rotatable blocking lever 18 when the reflecting mirror 2 is rotated from the viewing position into the picture taking position. The vertical guide slot 10b in the rear wall 10 of the view finder casing receives therein a pin member 28a of the manual releasing button 28 which projects outwardly of the rear wall 10, so that if the manual releasing button 28 is pressed downwardly along the vertical slot 10b, the inner end of the pin member 28a is brought into engagement with the bent portion 18e of the blocking lever when the latter is in its clockwise position.

With the construction of the present invention as described above, when the first operating lever 12 is rotated counterclockwise by means of the spring member 15, the upper blind member 16 is pushed upwardly along the grooves 13b and 13c to uncover the upper half of the opening 13a, and at the same time the second operating lever 14 is rotated clockwise to uncover the lower half of the opening 13a, thus completely uncovering the opening or aperture 13a to allow observation of the focusing screen 3 through the viewing hole 7 for viewing and adjustment purposes.

In order to carry out a photographing operation under the control of the selftimer, the lever 22e is rotated to charge the selftimer driving spring after advancing of the film and the cocking of the shutter, until the lever 22e is brought into the position shown in FIG. 3. Thereafter, the camera is fixed on a tripod and, after suitable focusing adjustments facilitated by viewing through the viewing hole 7, the closing button 11 is moved leftward as seen in FIG. 4. By this operation, the pin member 11a causes the first operating lever 12 to rotate clockwise against the action of the spring member 15, and the second operating lever 14 is rotated counterclockwise against tension in the spring 15 by the cooperative action of the pin member 12c and the slot 14b, closing the opening 13a of the plate member 13 by the upper and lower blind members 16 and 17. The stopper pin member 12d of the first operating lever 12 is brought into engagement with the stepped portion 18b of the blocking lever 18 to block its returning action and therefor the shielding member 6 is retained in its shielding position.

When the blocking lever 18 is rotated clockwise by the action of the spring member 19 with the stop pin member 12d entering into the recess of the blocking lever, the self-timer release pin member 18c fixed on the blocking lever 18 is brought into engagement with the bent shoulder portion 20b of the locking lever 20 (shown downwardly inclined to the right in FIG. 3) to rotate the locking lever 20 and retract the locking arm 20c from the escape wheel 22a. Rotation of the selftimer mechanism is thus started by the charged driving spring and the guide groove 22f pushes down the release lever 23a through the pin member 23b over a predetermined period of time. During this time period, the operator can get to the photographing spot, and the blind members 16 and 17 completely shield the light rays incident through the viewing hole 7 of the view finder. When the release lever 23a is lowered by a predetermined distance, the light measuring circuit A is disconnected from the storing circuit B which is in turn connected to the timing circuit C, in the manner well known in the art. Then the driving mechanism 24 of the reflecting mirror 2 is unlocked, allowing the reflecting mirror 2 to rotate from the viewing position into the picture taking position. During rotation of the reflecting mirror 2, the releasing pin member 25a of the releasing lever 25 is brought into abutting engagement with the bent portion 18d of the blocking lever 18, rotating the blocking lever 18 counterclockwise against the action of the spring member 19, disengaging the stepped portion 18b of the blocking lever 18 from the locking pin member 12d. As a result, the first and second operating levers 12 and 14 are rotated counterclockwise and clockwise, respectively, by the action of the spring member 15 and the blind members 16 and 17 uncover the opening 13a for opening the viewing hole 7 in preparation for the subsequent photographing operation. When the reflecting mirror 2 reaches its photographing position, the shutter is released through a known mechanism.

The manual releasing button 28 is provided for manually opening the aperture 13a which has been previously closed by the operation of the closing button 11 as mentioned above. By depressing the manual releasing button 28, the pin member 28a is brought into engagement with the bent portion 18e of the blocking lever 18 and causes the same to rotate counterclockwise, disengaging the stepped portion 18b from the locking pin member 12d for opening the aperture 13a and at the same time disengaging the selftimer release pin 18c from the bent portion 20b of the blocking lever 20. The blocking lever 20 is therefor rotated counterclockwise by the action of the spring member 21, with the locking arm 20c engaged again with the escape wheel 22a for locking the selftimer and blocking release of the shutter.

It will be appreciated from the foregoing that, according to the present invention, while the light measuring circuit A is connected to the storing circuit, the viewing hole of the view finder is shielded by the shielding device to block the light rays which would otherwise be incident on the light receiving element of the light measuring circuit through the viewing hole.

While a specific embodiment of a single lens reflex camera has been disclosed in the foregoing description, it will be understood that various modifications and changes within the spirit of the invention may occur to those skilled in the art. Therefor, it is intended that no limitations be placed on the invention except as defined by the scope of the appended claims.

I claim:

1. In a single lens reflex camera including a shutter, means including a selftimer for releasing said shutter a predetermined interval following the release of said selftimer, an objective lens, a view finder including a viewing aperture for viewing an object through said objective lens, a photsensitive element exposed to light traversing said objective lens and said viewing aperture and an automatic exposure network responsive to said photosensitive element, the improvement comprising a blind movable between an advanced position intercepting the light traversing said viewing aperture to prevent its incidence on said photosensitive element and a retracted position out of the path of said light, and means actuated with the advance and retraction of said blind for respectively enabling and disabling said selftimer.

2. The camera of claim 1 comprising spring means biasing said blind toward its retracted position and means for releasably locking said blind in its advanced position and movable between blind lock and release positions, said self-timer enabling means responsive to the movement of said locking means to lock and release positions for respectively releasing and restraining the operation of said self-timer.

3. The camera of claim 2 wherein said selftimer includes an escape wheel and said enabling means includes an element movable into and out of engagement with said escape wheel with the movement of said blind locking means to its release and lock positions respectively.

4. The camera of claim 2 wherein said view finder includes a mirror movable between a viewing position and a photographing position and including means for moving said blind locking means to its release position in response to the movement of said mirror from said viewing position toward said photographing position.

5. The camera of claim 4 including means for manually moving said blind locking means to its release position independently of the release of said shutter.

* * * * *